United States Patent
Chen et al.

(10) Patent No.: US 8,155,327 B2
(45) Date of Patent: Apr. 10, 2012

(54) TONE DETECTOR AND METHOD USED IN A ROBOT FOR DETECTING A TONE

(75) Inventors: Yao-Sheng Chen, Hsin Chu County (TW); Min-Wei Chung, Taipei County (TW); Sung-Tsun Chou, Hsin Chu County (TW)

(73) Assignee: SONIX Technology Co., Ltd., Chupei, Hsinchu (TW)

( * ) Notice: Subject to any disclaimer, the term of this patent is extended or adjusted under 35 U.S.C. 154(b) by 491 days.

(21) Appl. No.: 12/483,896

(22) Filed: Jun. 12, 2009

(65) Prior Publication Data

US 2010/0086140 A1    Apr. 8, 2010

(30) Foreign Application Priority Data

Oct. 6, 2008   (TW) .............................. 97138359 A

(51) Int. Cl.
*H04R 29/00*   (2006.01)

(52) U.S. Cl. .......... 381/56; 381/58; 455/233.1; 455/267

(58) Field of Classification Search ............... 455/233.1, 455/703, 200.1, 156.1, 256, 267; 381/56, 381/58, 73, 77, 367, 101, 102, 104, 94.3, 381/320

See application file for complete search history.

(56) References Cited

U.S. PATENT DOCUMENTS

| | | | | |
|---|---|---|---|---|
| 4,689,760 A * | 8/1987 | Lee et al. | ....................... | 370/526 |
| 5,412,692 A * | 5/1995 | Uchida | ......................... | 375/317 |
| 6,381,330 B1 * | 4/2002 | Johanson | ....................... | 379/386 |
| 6,636,609 B1 * | 10/2003 | Ha et al. | ......................... | 381/104 |
| 6,671,252 B1 * | 12/2003 | Cannon et al. | ................ | 370/210 |
| 6,763,106 B1 | 7/2004 | Li et al. | | |
| 6,826,404 B2 * | 11/2004 | Delfs et al. | .................... | 455/445 |
| 6,950,511 B2 | 9/2005 | Das et al. | | |
| 7,245,637 B2 * | 7/2007 | Lam et al. | ...................... | 370/512 |
| 2003/0235291 A1 * | 12/2003 | Sauvage et al. | .............. | 379/386 |
| 2005/0030941 A1 * | 2/2005 | Lee et al. | ...................... | 370/352 |
| 2006/0152463 A1 * | 7/2006 | Furihata et al. | ................ | 345/98 |
| 2009/0265173 A1 * | 10/2009 | Madhavan et al. | ............ | 704/268 |

* cited by examiner

*Primary Examiner* — Dominic E Rego
(74) *Attorney, Agent, or Firm* — Muncy, Geissler, Olds & Lowe, PLLC

(57) ABSTRACT

A tone detection device for detecting whether an input signal having a tone. The device includes a volume gain calculation unit performing a volume gain treatment on frame data and outputting the volume-gain-treated frame data and energy in time domain thereof, a threshold calculation unit calculating a threshold value on the basis of the energy of the volume-gain-treated frame data, a filter transforming the volume-gain-treated frame data by an algorithm and outputting a characteristic value in a first period, and a comparator comparing the first characteristic value and the threshold value to generate a result and determining the frame data of the input signal has the tone on the basis of the result.

21 Claims, 10 Drawing Sheets

TONE DETECTOR AND METHOD USED IN A ROBOT FOR DETECTING A TONE

BACKGROUND OF THE INVENTION (a) Field of the Invention

The invention relates to a tone detection device and a method thereof suitable to be used in a robot, particularly to a tone detection device and a method to acquire a command in a tone.

(b) Description of the Related Art

Generally, a Goertzel filter is used to differentiate noise, mute, sound, and tone in a telecommunication system. For example, the invention disclosed in U.S. Pat. No. 6,381,330 is applied in a telecommunication system where the receiving end is via wire input and the output of the Goertzel filter is used in detection. However, in this patent, the detecting procedure is to analyze a small portion instead of analyzing a whole frame to reduce the calculation volume and then to confirm either the tone signal exists or not by determining whether the harmonic wave is generated or not. Besides, for example, the invention disclosed in U.S. Pat. No. 6,671,252 is applied in a telecommunication system where the receiving end is via wire input and the output of the Goertzel filter is used in detection. In this patent, the detecting procedure is to utilize different functions of a short frame and a long frame to increase robustness during detection. The resolution in time domain during analyzing the short frame is increased while the noise resistance during analyzing the long frame is increased. In the common telecommunication system, the transmitter and the receiver are connected via wires and signals are transmitted to the receiver though wires. If signals are wirelessly transmitted, the correctness of detecting the signals will be reduced due to the distance existed between the receiver and transmitter. Besides, specifically, as a loud-speaker utters an audio signal for being received by a microphone that is moving relative to the loud-speaker, the correctness of detecting the signals will be further reduced due to the variation of the distance between the loud-speaker and the microphone.

BRIEF SUMMARY OF THE INVENTION

In light of the above problems, one objective of the invention is to provide a tone detection device and a method thereof to increase the correctness of detecting signals. Another objective of the invention is to provide a tone detection device and a method thereof to acquire a command in a tone.

One embodiment of the invention is to provide a tone detection device for detecting whether an input signal having a tone. The input signal comprises at least one frame data. The device includes a volume gain calculation unit, a threshold calculation unit, a filter, and a comparator. The volume gain calculation unit performs a volume gain treatment on the frame data and outputs the volume-gain-treated frame data and the energy in time domain thereof. The volume gain treatment calculates the energy in time domain of the frame data and adjusts the magnitude of the frame data based on the energy of the frame data. The threshold calculation unit calculates a threshold value based on the energy of the volume-gain-treated frame data. The filter transforms the volume-gain-treated frame data by an algorithm and outputs a characteristic value in a first period. The comparator compares the first characteristic value with the threshold value to generate a comparison result and determines that the frame data of the input signal has the tone based on the comparison result.

Another embodiment of the invention is to provide a tone detection method suitable for detecting whether an input signal comprising at least a frame data has a tone. The method comprises a volume gain calculation step, a threshold calculation step, a conversion step, and a comparing step. The volume gain calculation step is to perform a volume gain treatment on the frame data and to output the volume-gain-treated frame data and the energy in time domain of the volume-gain-treated frame data. The volume gain treatment calculates the energy in time domain of the frame data and adjusts the magnitude of the frame data based on the energy of the frame data. The threshold calculation step is to calculate a threshold value based on the energy of the volume-gain-treated frame data. The conversion step is to transform the volume-gain-treated frame data by an algorithm and to output a first characteristic value in a first period. The comparing step is to compare the first characteristic value with the threshold value to generate a comparison result and to determine that the frame data of the input signal has the tone based on the comparison result.

In one embodiment, in the above tone detection device and method, the filter further outputs a second characteristic value in a second period and determines that the frame data of the input signal does not have the tone if the first and second characteristic values do not satisfy a predetermined relationship. Preferably, the predetermined relationship is a frequency band continuing relation. In addition, the filter is a Goertzel filter and the algorithm is the Goertzel algorithm. The conversion step utilizes the Goertzel algorithm.

In one embodiment, the above tone detection device and method further comprise a command-outputting unit and step, respectively, to output a command when the number of the frame data having the tones is determined to satisfy a predetermined number.

In one embodiment, the above tone detection device and method can determine the tone, especially can adjust the calculation means, based on the variation of the distance between the receiver and the transmitter, to correctly determine the tone.

DETAILED DESCRIPTION OF THE INVENTION

Figure 1:
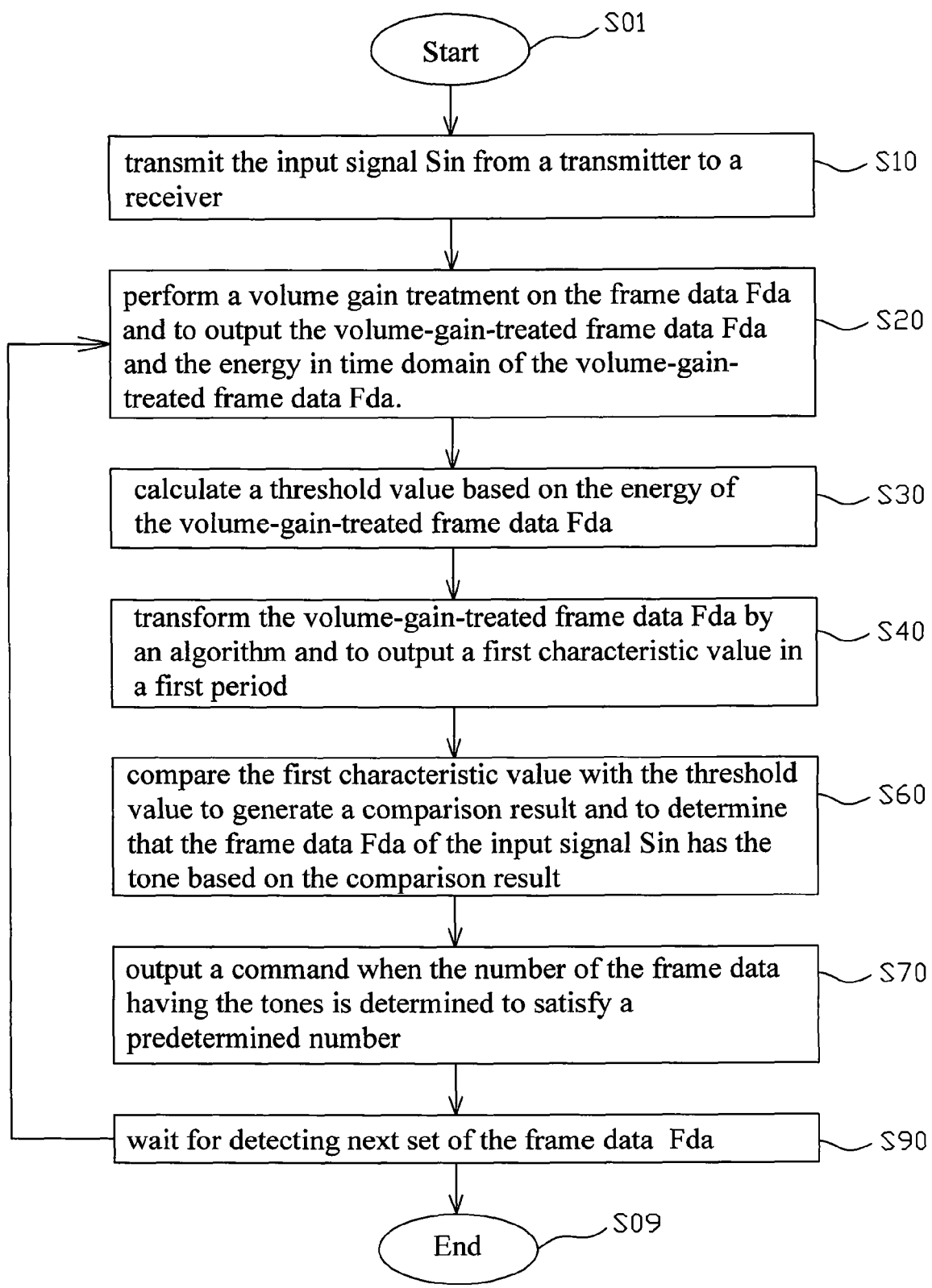
FIG. 1 shows a flow chart illustrating the tone detection method according to one embodiment of the invention.

FIG. 1 shows a flow chart illustrating the tone detection method according to one embodiment of the invention. As shown in FIG. 1, the tone detection method is suitable for detecting whether an input signal Sin has a tone "Tone" or not. The input signal Sin comprises at least one frame data Fda.

In one embodiment, the input signal Sin can be an audio signal and outputted by the transmitter of a loud-speaker to be received by a receiver. The receiver can convert an analog audio signal into a digital audio signal. The input signal Sin can be a tone "Tone". A command can be planted in the tone "Tone" based on the frequency versus time relationship of the tone "Tone". Preferably, a frequency of the tone "Tone" lasts for a different period of time to plant a command in the tone "Tone". In this embodiment, the tone "Tone" has a first frequency and a second frequency. Preferably, the first frequency is different from the second frequency.

Figure 2:
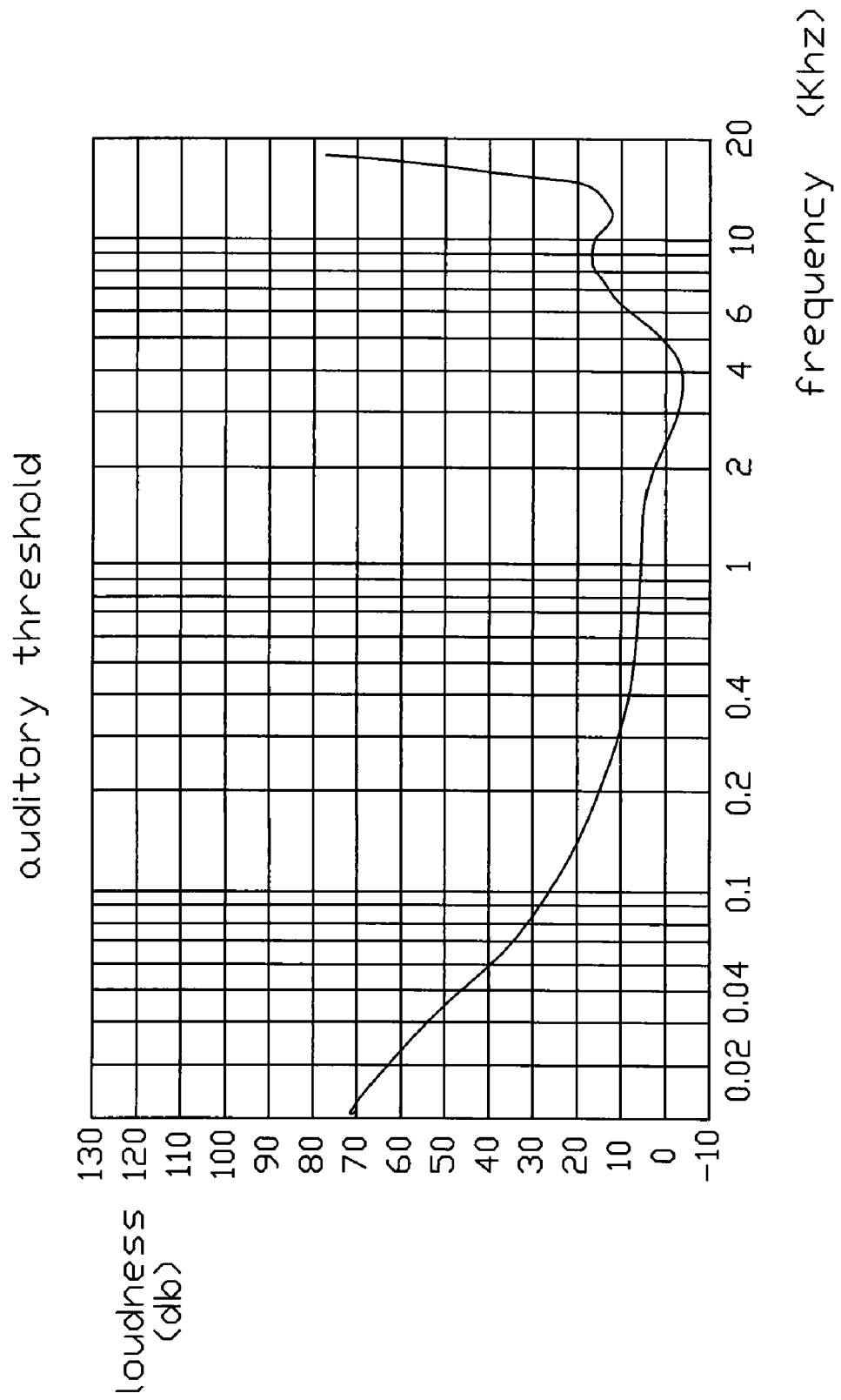
FIG. 2 shows a loudness-frequency curve illustrating auditory threshold.

Besides, the input signal Sin, an audio signal, can also comprise a background sound and a tone "Tone". In practice, the background sound can be background music from a compact disc (CD) played by a CD player. FIG. 2 shows a loudness versus frequency curve illustrating auditory threshold. As shown in FIG. 2, when the frequency of sound is 1 kHz, a loudness of 7 db can be even heard. When the frequency of sound is 20 kHz, the loudness needs 70 db to be heard. Therefore, the frequency of the background sound is set to be lower for being heard by human beings, while the first frequency and the second frequency of the tone "Tone" are set to be higher so that interfering the tone will be reduced while listening music. The frequency of the background sound can be set to be lower than 16 kHz, preferably lower than 10 kHz, more preferably lower than 5 kHz. The first frequency and the second frequency of the tone St can be set to be higher than or equal to 16 kHz, separately. Preferably, the first frequency is set to 18 kHz and the second frequency is set to 20 kHz.

Figure 3:
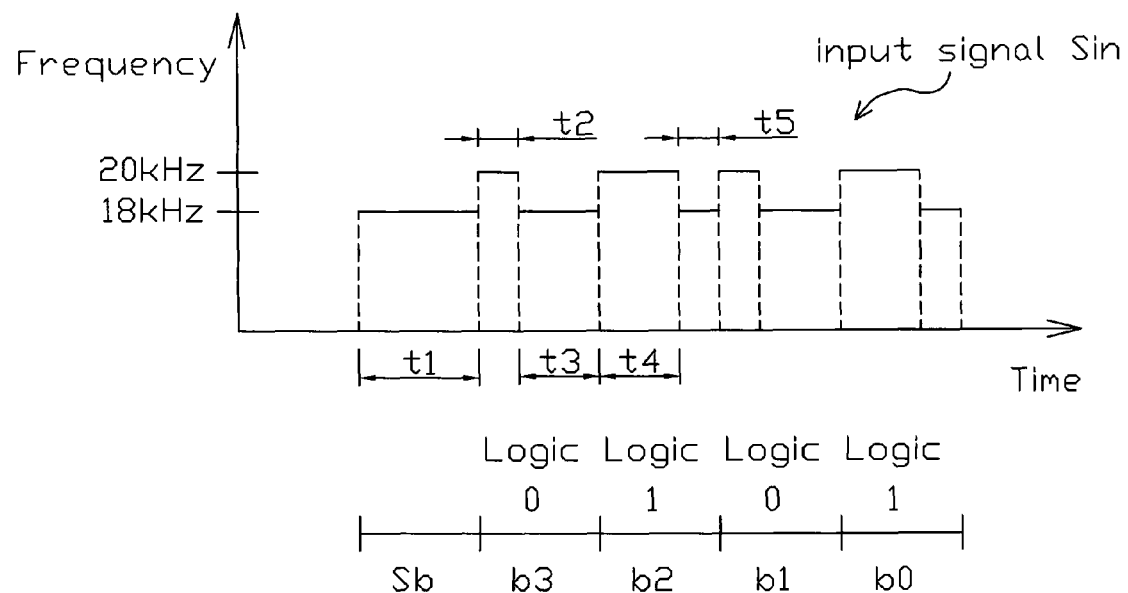
FIG. 3 shows a frequency-time curve illustrating a tone.

For example, the command set to have one start bit and 4 command bits will be described in detail. Each command bit is either logic 0 or logic 1. Therefore, $2^4$ commands can be generated. FIG. 3 shows a frequency versus time curve illustrating a tone. Specifically, the tone can comprise a command with a value of 0101. Table 1 discloses the example of the command with a value of 0101. Referring to Table 1 and FIG. 3, the start bit is that the first frequency lasts for a first period (for example, 0.045 sec). The command bit with logic 0 is that the second frequency lasts for a second period t2 (for example, 0.015 sec) and then the first frequency lasts for a third period t3 (for example, 0.03 sec). The command bit with logic 1 is that the first frequency lasts for a fourth period t4 (for example, 0.03 sec) and then the second frequency lasts for a fifth period t5 (for example, 0.015 sec). The start bit does not have any logic value and is for identification only.

TABLE 1

| Command (0101) | | Tone |
| --- | --- | --- |
| Start bit Sb (start bit) | | Frequency 18 kHz lasting for 0.045 sec |
| Command bit b3 | Logic 0 | Frequency 20 kHz lasting for 0.015 sec and Frequency 18 kHz lasting for 0.03 sec |
| Command bit b2 | Logic 1 | Frequency 20 kHz lasting for 0.03 sec and Frequency 18 kHz lasting for 0.015 sec |
| Command bit b1 | Logic 0 | Frequency 20 kHz lasting for 0.015 sec and Frequency 18 kHz lasting for 0.03 sec |
| Command bit b0 | Logic 1 | Frequency 20 kHz lasting for 0.03 sec and Frequency 18 kHz lasting for 0.015 sec |

Figure 4:
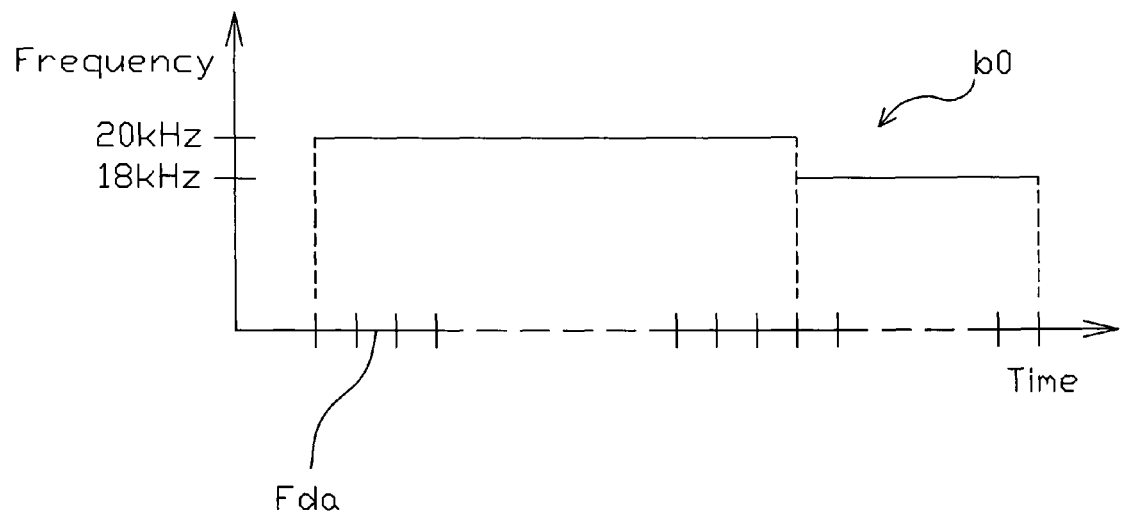
FIG. 4 shows a frequency versus time curve illustrating the tone having one command bit.

FIG. 4 shows a frequency versus time curve illustrating the tone having one command bit. The command bit b0 comprises a plurality of sets of the frame data Fda. The required time for each frame data is determined by the product design and the selection of the receiver with a proper sampling rate. For example, the command bit b0 needs the frequency 20 kHz lasting for 0.015 sec and the frequency 18 kHz lasting for 0.03 sec, that is, a total of 0.045 sec. As the required time for each frame data for the receiver is 0.045/450 sec, the command bit b0 comprises 450 sets of the frame data Fda. The detail is shown in Table 2.

TABLE 2

| Command (0101) | | Tone |
| --- | --- | --- |
| Start bit Sb (start bit) | | 450 sets of the frame data Fda with the frequency 18 kHz |
| Command bit b3 | Logic 0 | 150 sets of the frame data Fda with the frequency 20 kHz; 300 sets of the frame data Fda with the frequency 18 kHz |
| Command bit b2 | Logic 1 | 300 sets of the frame data Fda with the frequency 20 kHz; 150 sets of the frame data Fda with the frequency 18 kHz |
| Command bit b1 | Logic 0 | 300 sets of the frame data Fda with the frequency 20 kHz; 150 sets of the frame data Fda with the frequency 18 kHz |
| Command bit b0 | Logic 1 | 300 sets of the frame data Fda with the frequency 20 kHz; 150 sets of the frame data Fda with the frequency 18 kHz |

Referring to FIG. 1 again, the tone detection method comprises the following steps:

S01: Start;

S10: a signal transmitting step, to transmit the input signal Sin from a transmitter to a receiver capable of moving relative to the transmitter;

S20: a volume gain calculation step, to perform a volume gain treatment on the frame data Fda and to output the volume-gain-treated frame data Fda and the energy in time domain of the volume-gain-treated frame data Fda; the volume gain treatment calculates the energy in time domain of the frame data Fda and adjusts the magnitude of the frame data based on the energy of the frame data Fda;

S30: a threshold calculation step, to calculate a threshold value based on the energy of the volume-gain-treated frame data Fda;

S40: a conversion step, to transform the volume-gain-treated frame data Fda by an algorithm and to output a first characteristic value in a first period; in one example, a second characteristic value in a second period can further be outputted;

S60: a comparing step, to compare the first characteristic value with the threshold value to generate a comparison result and to determine that the frame data Fda of the input signal Sin has the tone based on the comparison result; in one example, it is determined that the frame data Fda of the input signal Sin does not have the tone if that the first and second characteristic values do not satisfy a predetermined relationship is detected;

S70: a command-outputting step, to output a command when the number of the frame data having the tones is determined to satisfy a predetermined number;

S90: a waiting step, to wait for detecting next set of the frame data Fda; in one example, further go to the step S20 after a predetermined period of time based on the design;

S09: End.

Figure 5A:
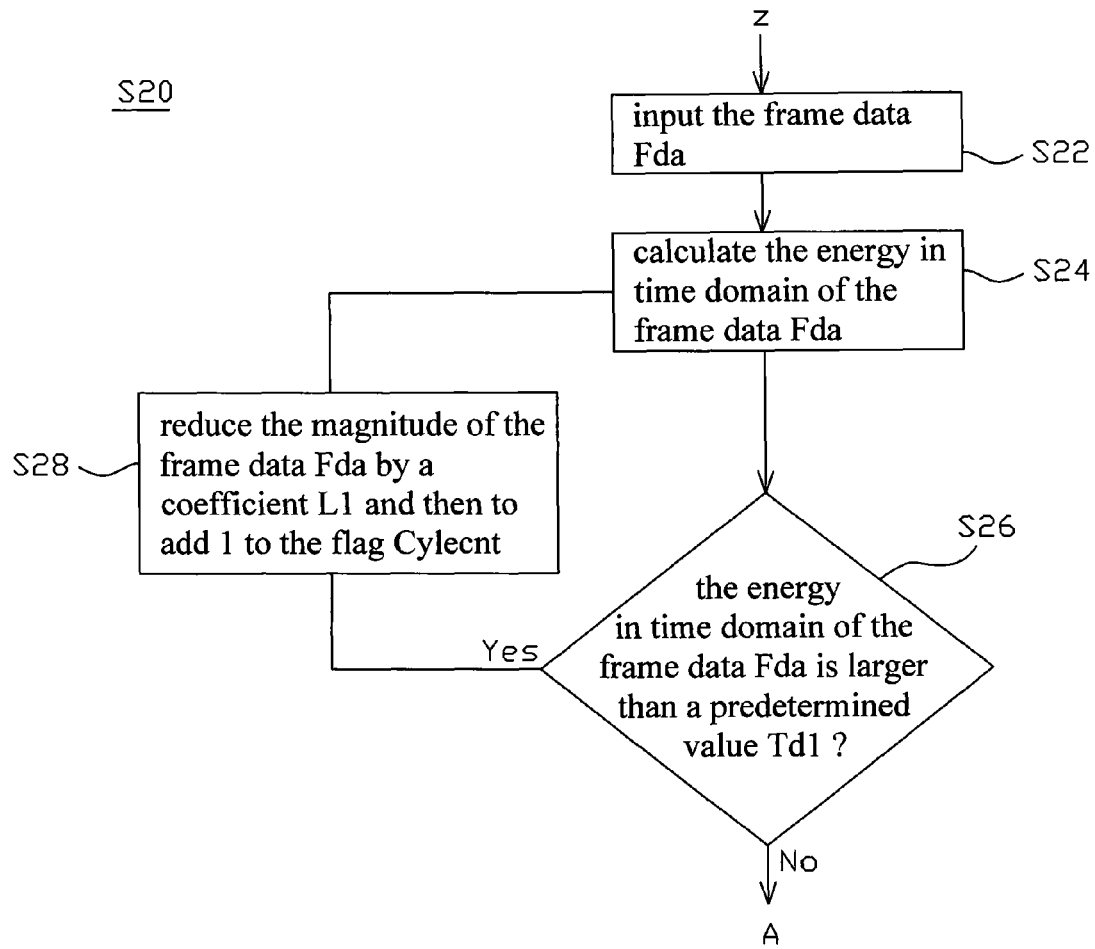
FIGS. 5A-5F show flow charts illustrating the steps of the tone detection method according to one embodiment of the invention.

FIG. 5A shows a flow chart illustrating the volume gain calculation step of the tone detection method according to one embodiment of the invention. As shown in FIG. 5A, the volume gain calculation step comprises a step S22, to input the frame data Fda, and a volume gain treatment step. The volume gain treatment step comprises a step S24, a step S26, and a Step 28. The step S24 is to calculate the energy in time domain of the frame data Fda. The step S26 is to determine whether the energy in time domain of the frame data Fda is larger than a predetermined value Td1, such as 29490, or not; to go to the step S28 if yes; and to output the energy and the frame data Fda and then go to step S30 if not. At the time, the volume-gain-treated frame data Fda and the energy thereof without going through the step S28 equal the frame data Fda and the energy thereof inputted from the step S22, respectively. The step S28 is to reduce the magnitude of the frame data Fda by a coefficient L1, such as a value of 0.5 and then to add 1 to the flag Cyclecnt that has a preset value of 0 and go to the step S24.

When the energy of the inputted frame data Fda is too large, that is, the volume is too large, the calculation of the Goertzel filter that will be described later becomes less accurate, for example, having overflow. Therefore, in this embodiment, the energy of the frame data Fda is acquired. As it is determined that the energy is beyond a predetermined value Td1, the magnitude of the frame data Fda will be reduced by a coefficient L1 until the energy of the volume-gain-treated frame data Fda becomes smaller than the predetermined value Td1. Specifically, the predetermined value Td1 is set to 90% of the maximum energy value of a signed word. In addition, in one example, a volume gain calculation unit is used to execute the volume gain calculation step.

Figure 5B:
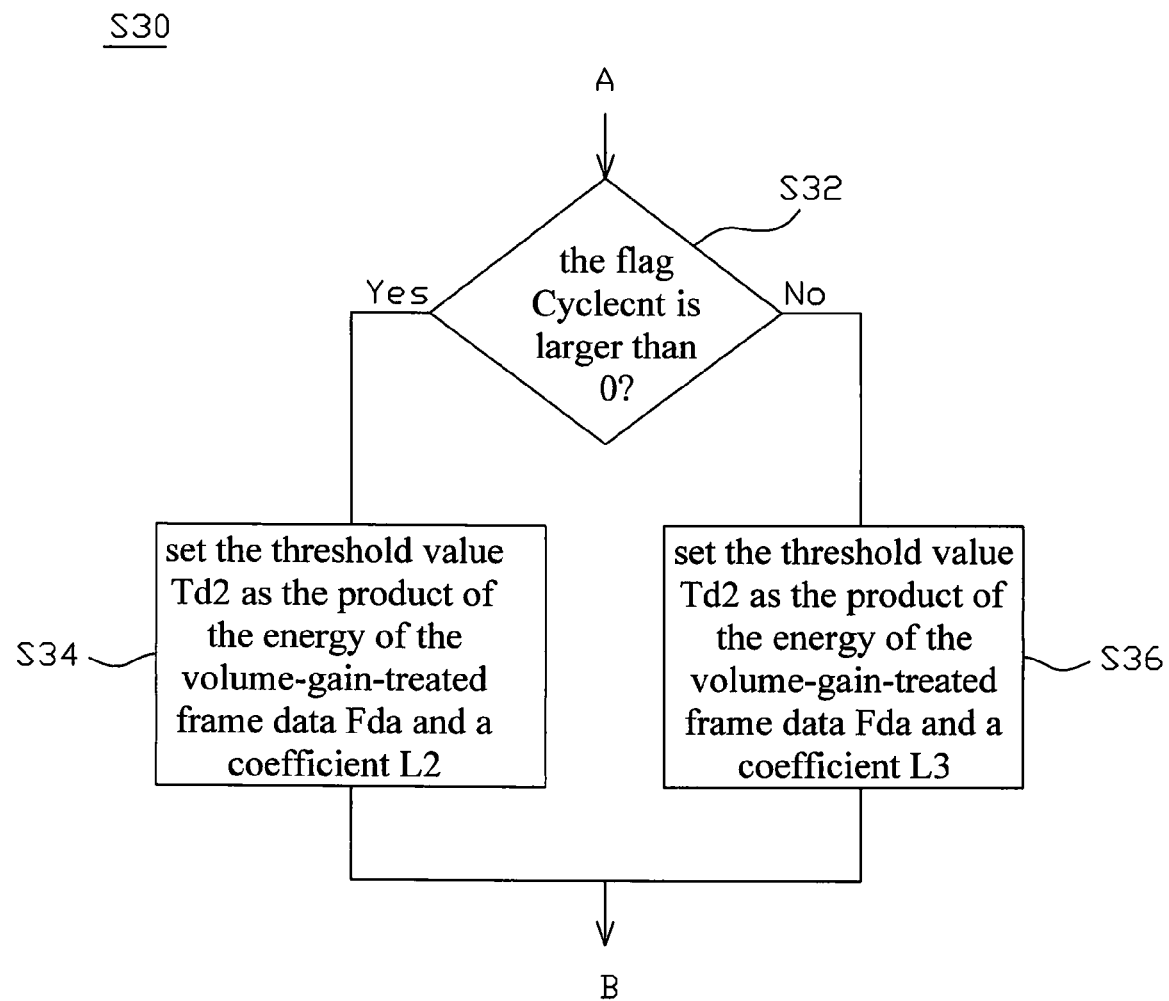

FIG. 5B shows a flow chart illustrating the threshold calculation step of the tone detection method according to one embodiment of the invention. As shown in FIG. 5B, the threshold calculation step comprises a step S32, a step S34, and a step S36. The step S32 is to determine whether the value of the frame data Fda is adjusted or not and then to go to the step S34 if yes and go to the step S36 if not. Specifically, when the flag Cyclecnt is larger than 0, the value of the frame data Fda has been adjusted, referring to FIG. 5A and the step S26. When the flag Cyclecnt equals the preset value, that is 0, the value of the frame data Fda has not been adjusted. The step S34 is to set the threshold value Td2 as the product of the energy of the volume-gain-treated frame data Fda and a coefficient L2, such as a value of 0.7. The step S36 is to set the threshold value Td2 as the product of the energy of the volume-gain-treated frame data Fda and a coefficient L3, such as a value of 0.48.

When the relative distance between the receiver and the transmitter is changed, the volume of the audio signal received by the receiver is also changed. The tone detection method dynamically adjusts the threshold value Td2 based on the volume of the audio signal received by the receiver so as to more accurately determine whether the input signal Sin has a tone "Tone" or not. In addition, a threshold calculation unit can be used to execute the threshold calculation step.

Figure 5C:
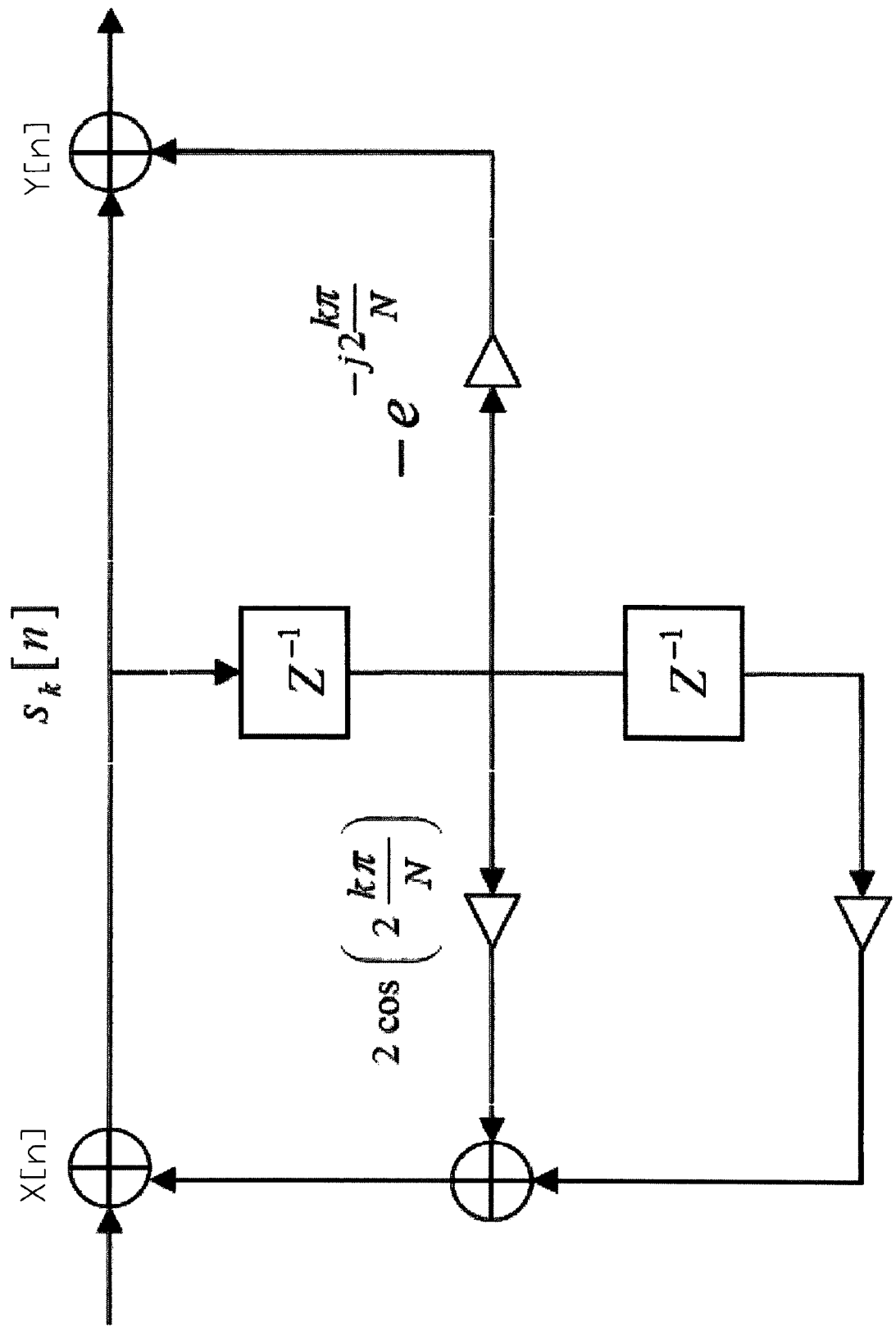

The conversion step can be executed in the Goertzel filter. The Goertzel algorithm is used to transform the frame data Fda to acquire a first characteristic value in a first period. FIG. 5C shows a flow chart illustrating the algorithm in the conversion step of the tone detection method according to one embodiment of the invention. Specifically, it shows the flow chart of the Goertzel algorithm. As shown in FIG. 5C, the Goertzel filter outputs the obtained characteristic value after calculating a feedback phase series s[n] according to the input series x[n] by using the following equations (1), (2), and (3) and then calculating the output series y[n] based on the calculation procedures shown in FIG. 5C.

$$s_k[n] = x[n] + 2\cos\left(\frac{2k\pi}{N}\right)s_k[n-1] - s_k[n-2] \quad (1)$$

$$y_k[n] = s_k[n] - e^{-j2\frac{k\pi}{N}}s_k[n-1] \quad (2)$$

$$k = N \times \frac{f_{tone}}{f_{sample}} \quad (3)$$

In the above equations, N is a sampling quantity of the frame data, $f_{sample}$ is the frequency of sampling (the sampling frequency of the sampling device, such as an AD converter, of a receiver in this example), $f_{tone}$ is the frequency of the tone (18 kHz and 20 kHz used in this example), $s_k[-1]$ and $s_k[-2]$ are the feedback storage elements for a frequency point, the values of which are both zeros, n is 0, 1, 2, . . . , N−1, $s_k[n]$ is the data of the $n^{th}$ frame data in the $k^{th}$ period, and the characteristic value $y_k[n]$ is the output of the $n^{th}$ frame data in the $k^{th}$ period.

The Goertzel algorithm uses a second order recursive infinite impulse response filter in FIG. 5C for discrete signal Fourier transform, that is well known for those who are skilled in the digital signal processing field. Thus, its detail will be omitted hereafter.

Figure 5D:
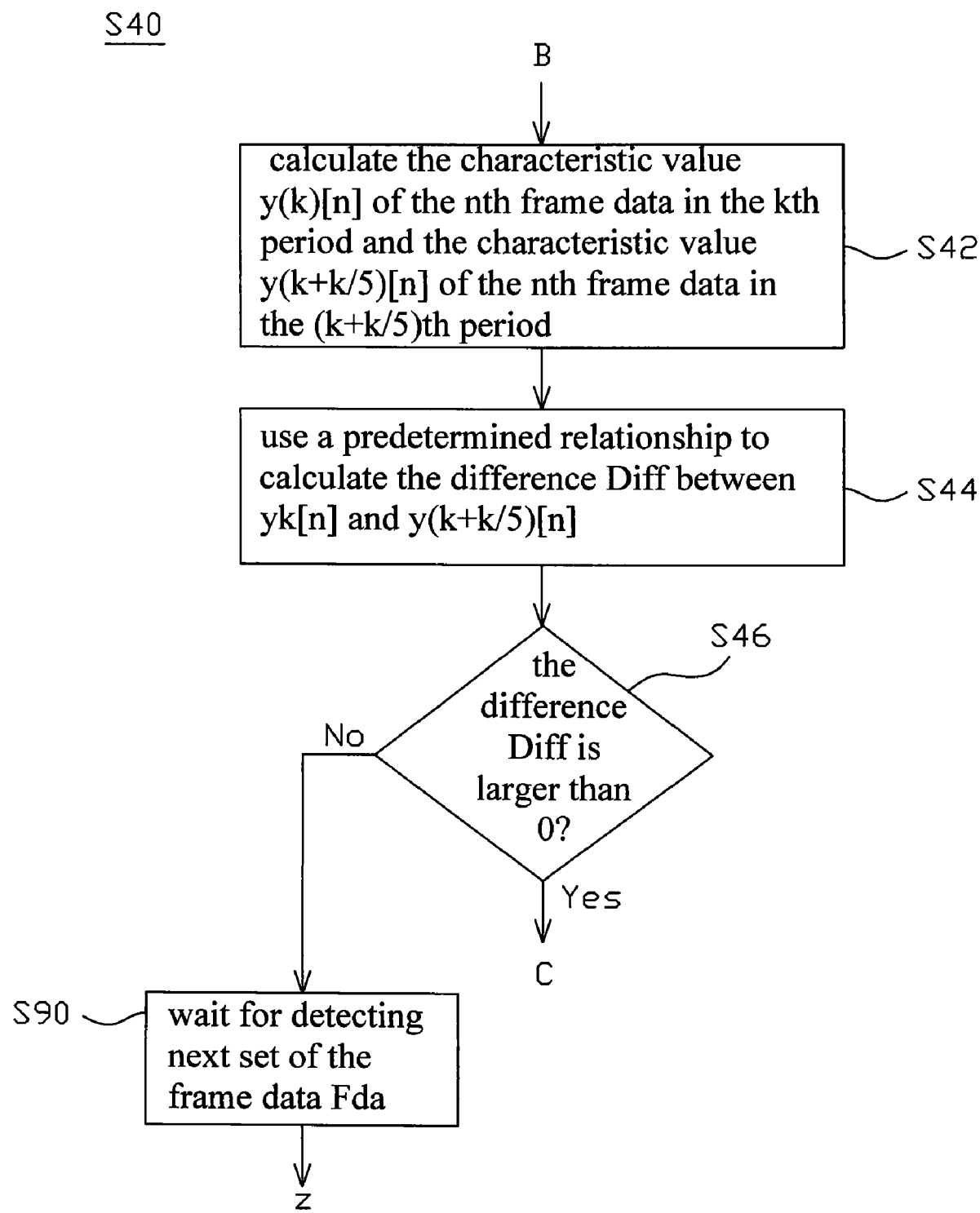

FIG. 5D shows a flow chart illustrating the conversion step of the tone detection method according to one embodiment of the invention. As shown in FIG. 5D, the conversion step comprises a step S42, a step S44, and a step S46. The step S42 is to calculate the characteristic value $y_k[n]$ of the $n^{th}$ frame data in the $k^{th}$ period and the characteristic value $y_{(k+k/5)}[n]$ of the $n^{th}$ frame data in the $(k+k/5)^{th}$ period. The step S44 is to use a predetermined relationship to calculate the difference Diff between $y_k[n]$ and $y_{(k+k/5)}[n]$. The step S46 is to determine whether the difference Diff is larger than 0 or not and, if yes, meaning that the frame data Fda is noise, that is, the frame data Fda does not have a tone "Tone", go to the step S90 and, if not, meaning that the frame data Fda is a working signal, go to the step S62. The working signal may comprise a background sound or the tone "Tone", that is not noise N. In the step S44, a predetermined relationship is used to determine whether the frequency of the current frame data Fda and the frequency of the previous frame data Fda have a frequency band continuing relationship or not. The embodiment uses the following equation (4) to obtain the difference Diff between $y_k[n]$ and $y_{(k+k/5)}[n]$.

$$\text{Diff} = \text{Scale} \times y_k[n] - y_{k+k/5}[n] \quad (4)$$

The "Scale" is set to 0.4. When the tone detection method is in operation, the noise N may be generated to affect the correctness of detection. Since the frequency band of the noise N has no continuous relation, when the frequency band of some frame data Fda of the input signal Sin has no continuous relation, this frame data Fda is determined to be noise and then filtered so that the correctness of detection can be increased. It should be understood that the correctness of detection in the tone detection method can be further increased by determining whether the input signal Sin has the frequency band continuing relationship or not. In one example, only the later comparing step is to determine whether the frame data Fda has a tone "Tone" or not.

Figure 5E:
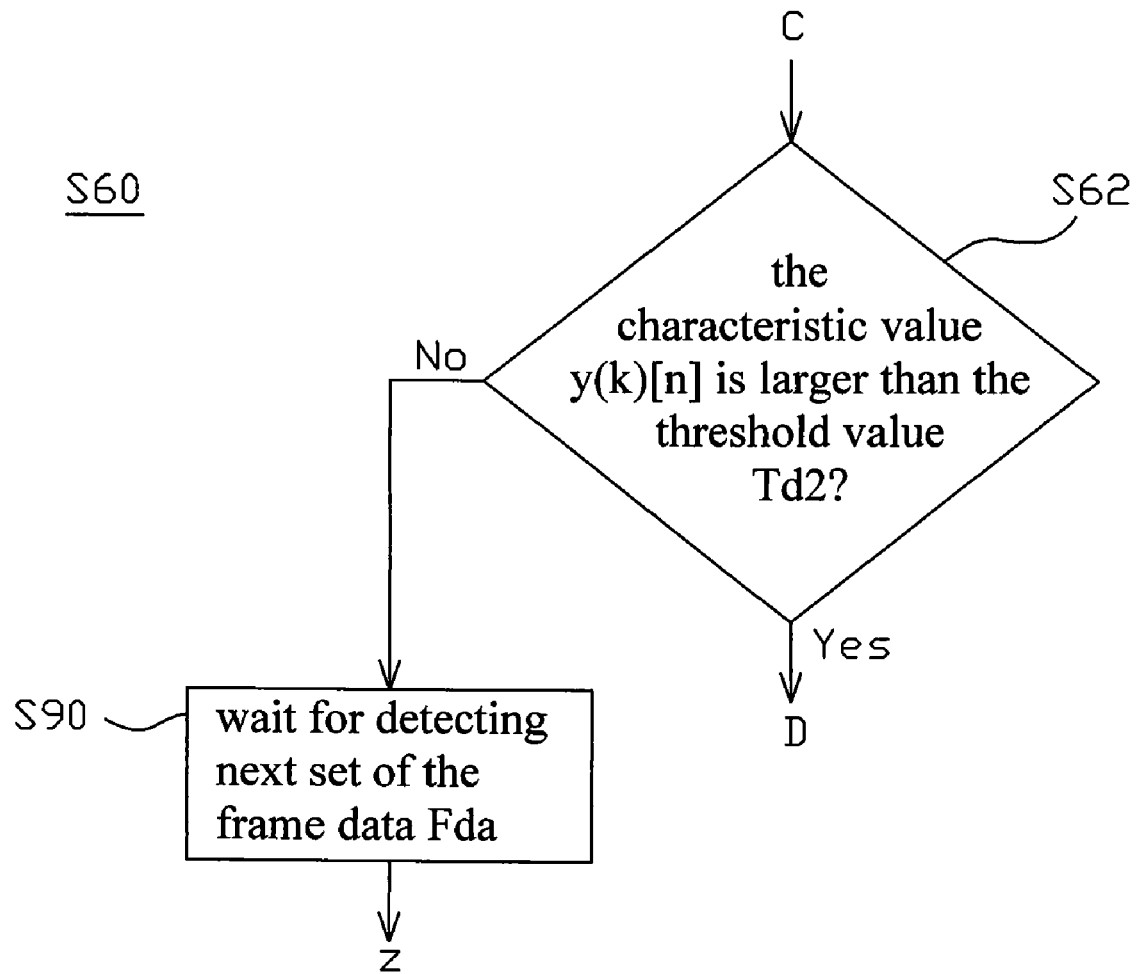

FIG. 5E shows a flow chart illustrating the comparing step of the tone detection method according to one embodiment of the invention. The comparing step comprises a step 62 to compare the characteristic value $y_k[n]$ with the threshold value Td2 and determine whether the characteristic value $y_k[n]$ is larger than the threshold value Td2 or not. If yes, the frame data Fda is determined to have a tone "Tone" and then the step S72 is executed. If not, frame data Fda is determined to have noise N and then the step S90 is executed. Besides, in one example, the tone is determined by comparing the energy in time domain with the output in frequency domain. Therefore, a comparator with lower cost can be used to execute the comparing step so as to lower production cost.

Figure 5F:
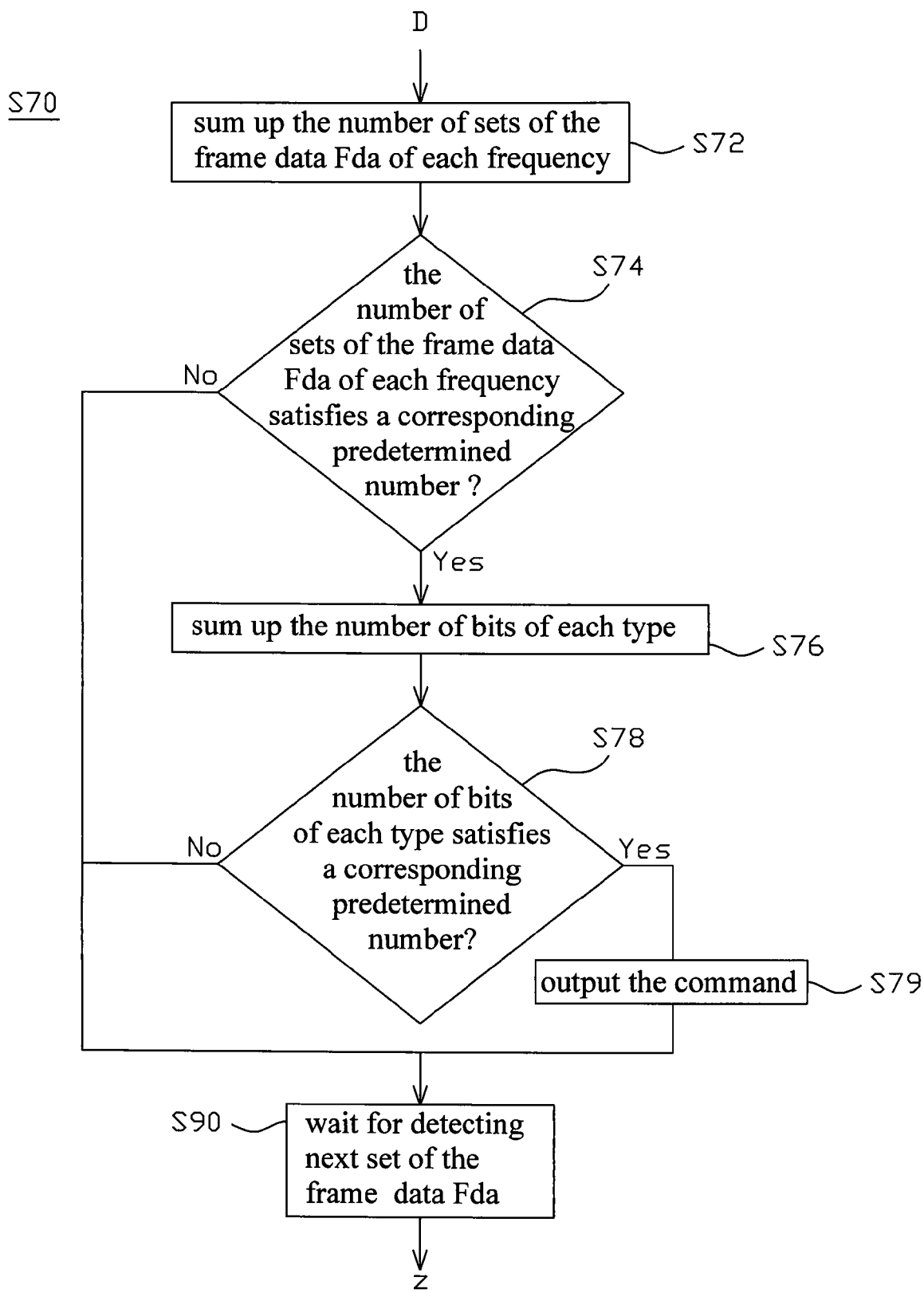

FIG. 5F shows a flow chart illustrating the command-outputting step of the tone detection method according to one embodiment of the invention. The command-outputting unit can be used to execute the command-outputting step. Preferably, the command-outputting unit comprises a bit determining unit for executing the determining step and a command determining unit for executing the command determining step. The bit determining step comprises a step S72 to sum up the number of sets of the frame data Fda of each frequency. The step S74 is to determine whether the number of sets of the frame data Fda of each frequency satisfies a corresponding predetermined number or not. If yes, one bit is outputted and the step S76 is executed. If not, the step S72 is executed. The command determining unit comprises a step S76 to sum up the number of bits of each type. The step S78 is to determined whether the number of bits of each type, for example, start bit and/or command bit, satisfies a corresponding predetermined number or not. If yes, the step S79 is executed and, if not, the step S90 is executed. The step S79 is to output this command.

Specifically, referring to Tables 1 and 2, when it is determined that the number of sets of the frame data Fda with 18 kHz frequency satisfies 450 sets, a start bit is outputted. When it is determined that the number of sets of the frame data Fda with 18 kHz frequency satisfies 300 sets and the number of sets of the frame data Fda with 20 kHz frequency satisfies 150 sets, a command bit with logic 0 is outputted. When it is determined that the number of sets of the frame data Fda with 18 kHz frequency satisfies 150 sets and the number of sets of the frame data Fda with 20 kHz frequency satisfies 300 sets, a command bit with logic 1 is outputted. When the number of command bits equal 4, the command is outputted.

Obviously, the technique to design a command is not the limitation of the invention. For example, a command can be set that the 20 kHz frequency lasting for 0.03 sec is considered to be logic 0 and the relation between the other frequency and time has no logic value. Or, for example, logic 1 is defined that the 20 kHz frequency lasts for 0.03 sec and then the tone "Tone" stops playing for 0.015 sec. Therefore, $2^1$ commands or $2^2$ commands can be generated, separately. In such condition, only the number of sets of the frame data Fda is calculated and then this command is outputted.

Figure 6:
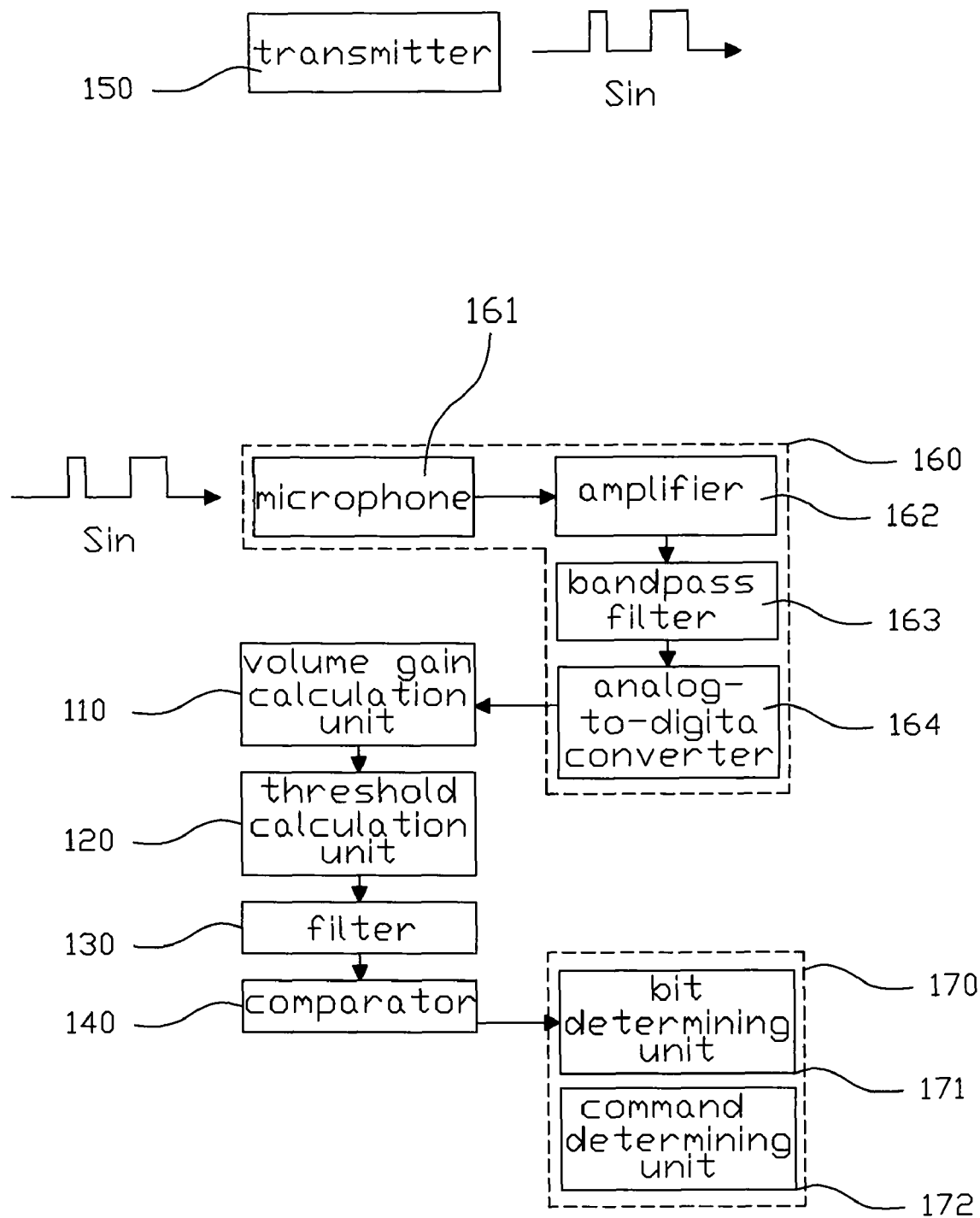
FIG. 6 shows a functional block diagram illustrating the tone detection device according to one embodiment of the invention.

FIG. 6 shows a functional block diagram illustrating the tone detection device according to one embodiment of the invention. As shown in FIG. 6, the tone detection device 100 according to one embodiment of the invention is suitable for detecting whether an input signal Sin has at least one tone "Tone" where the input signal Sin comprises at least one frame data Fda. The tone detection device 100 comprises a volume gain calculation unit 110, a threshold calculation unit 120, a filter 130, and a comparator 140. In addition, the tone detection device 100 may further comprise a transmitter 150 and a receiver 160. Preferably, a command-outputting unit 170 is also included.

The volume gain calculation unit 110 performs a volume gain treatment on the frame data Fda and outputs the volume-gain-treated frame data Fda and the energy in time domain of the volume-gain-treated frame data Fda. The volume gain treatment calculates the energy in time domain of the frame data and adjusts the magnitude of the frame data based on the energy of the frame data Fda. The threshold calculation unit 120 calculates a threshold value based on the energy of the volume-gain-treated frame data. The filter 130 transforms the volume-gain-treated frame data Fda by an algorithm and outputs a first characteristic value in a first period. In one example, the filter 130 is a Goertzel filter and the algorithm is the Goertzel algorithm. The filter 130 can further output a second characteristic value in a second period. If the first characteristic value and the second characteristic value do not satisfy a predetermined relationship, it is determined that the frame data Fda of the input signal Sin does not have a tone "Tone". The comparator 140 compares the first characteristic value with the threshold value to generate a comparison result and determining that the frame data Fda of the input signal Sin has the tone "Tone" based on the comparison result. The command-outputting unit 170 outputs a command when it is determined that the number of sets of the frame data Fda having the tone "Tone" satisfies a preset number of sets. In one example, the command-outputting unit 170 comprises a bit determining unit 171 and a command determining unit 172. The bit determining unit 171 sums up the number of sets of the frame data Fda of each frequency and determines whether the number of sets of the frame data Fda of each frequency satisfies a corresponding predetermined number or not. If yes, one bit is outputted. The command determining unit 172 sums up the number of bits of each type and determines whether the number of bits of each type satisfies a corresponding predetermined number or not. If yes, a command is outputted.

More specifically, the volume gain calculation unit 110, the threshold calculation unit 120, the filter 130, and the comparator 140 can be implemented by a program and a digital signal processor. Or, they can be implemented by a properly-designed chip. Therefore, the further detail will not be described hereafter.

The transmitter 150 can be a loud-speaker and output the input signal Sin, an audio signal. The receiver 160 can have a distance apart from the transmitter 150 and can move relative to the transmitter 150, which is a loud-speaker, suitable for receiving the input signal Sin. The receiver 160 may comprises a microphone 161, an amplifier 162, a bandpass filter 163, and an analog-to-digital converter 164. The microphone 161 can be an electric condenser microphone (ECM) for receiving the input signal Sin. The amplifier 162 is provided to amplify the input signal Sin received by the microphone 161 since occasionally the amplitude of the input signal Sin received by the microphone 161 is too weak or the characteristic of the microphone 161 results in the output signal being too weak. The sound and tone produced by the loud-speaker 150 are analog signals, while the volume gain calculation unit 110 is implemented by a digital signal processor to process digital signals. Thus, the analog-to-digital converter 164 is provided between the microphone 161 and the volume gain calculation unit 110 to convert the analog audio signal into a digital audio signal. In addition, the bandpass filter 163 can be provided between the amplifier 162 and the analog-to-digital converter 164. In one example, the frequency of the tone "Tone" can be set to be higher than 16 kHz. The background sound, including the sound in the environment where the tone detection device 100 is placed, generally is lower than 16 kHz. Therefore, the bandpass filter 163 can substantially filter the background sound in advance to increase the accuracy of detecting the command of the tone by the tone detection device 100 and the device for executing the tone detection method according to the invention.

The method, or other specific types or parts according to the embodiments of the invention can be in a form of program codes included in a physical medium, such floppy disk, optical disc, or hard disk, or any other machine-readable (such as computer) storage medium. When the program codes are loaded in a machine, such as a computer, and executed, this machine can be used as the device involved in the invention. The method and device of the invention can be transmitted in a form of program codes through transmitting media, such as wires, cables, optical fiber, or any other types of transmitting media. When the program codes are loaded in a machine, such as a computer, and executed, this machine can be used as the device involved in the invention. When operation is in a common processor, the program codes and the processor together can provide a special device applying specific logic circuits Although the present invention has been fully described by the above embodiments, the embodiments should not constitute the limitation of the scope of the invention. Various modifications or changes can be made by those who are skilled in the art without deviating from the spirit of the invention. Therefore, the scope of the invention is based on the appended claims and it should be accorded the broadest interpretation so as to encompass all such modifications and similar arrangements. One embodiment or claim does not have to encompass all the merits of the invention. Besides, the abstract and the title of the invention are for assisting in search, but not for constituting the limitation of the scope of the invention.

What is claimed is:

1. A tone detection device for detecting whether an input signal having at least a frame data has a tone, the device comprising:
   a volume gain calculation unit, performing a volume gain treatment on the frame data and outputting the volume-gain-treated frame data and the energy in time domain of the volume-gain-treated frame data, wherein the volume gain treatment calculates energy in time domain of the frame data and adjusts the magnitude of the frame data based on the energy of the frame data;
   a threshold calculation unit, calculating a threshold value based on the energy of the volume-gain-treated frame data;
   a filter, transforming the volume-gain-treated frame data by an algorithm and outputting a first characteristic value in a first period; and
   a comparator, comparing the first characteristic value with the threshold value to generate a comparison result and determining that the frame data of the input signal has the tone based on the comparison result.

2. The device according to claim 1, further comprising:
   a transmitter; and
   a receiver, capable of moving relative to the transmitter, wherein the input signal is transmitted from the transmitter to the receiver.

3. The device according to claim 1, wherein the volume gain calculation unit reduces the magnitude of the frame data when it detects that the energy of the frame data is larger than a predetermined value.

4. The device according to claim 3, wherein, if the energy of the frame data is larger than the predetermined value, the volume gain calculation unit calculates the threshold value being the product of the energy of the volume-gain-treated frame data and a first coefficient, and if the energy of the frame data is smaller than the predetermined value, the volume gain calculation unit calculates the threshold value being the product of the energy of the volume-gain-treated frame data and a second coefficient that is different from the first coefficient.

5. The device according to claim 1, wherein the filter further outputs a second characteristic value in a second period and determines that the frame data of the input signal does not have the tone if the first and second characteristic values do not satisfy a predetermined relationship.

6. The device according to claim 5, wherein the predetermined relationship is a frequency band continuing relation.

7. The device according to claim 5, wherein the filter is a Goertzel filter and the algorithm is the Goertzel algorithm.

8. The device according to claim 1, further comprising: a command-outputting unit, outputting a command when the number of the frame data having the tones is determined to satisfy a predetermined number.

9. The device according to claim 1, wherein the tone has a first frequency and a second frequency, the input signal comprises a command, the command comprises a start bit and at least a command bit and the tone detection device further comprises a command-outputting unit comprising:
   a bit determining unit, outputting a start bit when the number of the frame data having the tones with the first frequency is determined to satisfy a first predetermined number, outputting the command bit having a first logic value when the number of the frame data having the tones with the first frequency is determined to satisfy a second predetermined number and the number of the frame data having the tones with the second frequency is determined to satisfy a third predetermined number, and outputting the command bit having a second logic value when the number of the frame data having the tones with the first frequency is determined to satisfy a fourth predetermined number and the number of the frame data having the tones with the second frequency is determined to satisfy a fifth predetermined number; and
   a command determining unit, outputting the command when the number of the at least one command bit satisfies a predetermined number of bits.

10. The device according to claim 9, wherein the second predetermined number is equal to the fifth predetermined number, the third predetermined number is equal to the fourth predetermined number, and the first predetermined number is equal to the sum of the second predetermined number and the third predetermined number.

11. The device according to claim 9, wherein the first frequency and the second frequency are larger than or equal to 16 kHz, separately.

12. A tone detection method, used in a robot and suitable for detecting whether an input signal comprising at least a frame data has a tone, the method comprising:
    a volume gain calculation step, to perform a volume gain treatment on the frame data and to output the volume-gain-treated frame data and the energy in time domain of the volume-gain-treated frame data, wherein the volume gain treatment calculates the energy in time domain of the frame data and adjusts the magnitude of the frame data based on the energy of the frame data;
    a threshold calculation step, to calculate a threshold value based on the energy of the volume-gain-treated frame data;
    a conversion step, to transform the volume-gain-treated frame data by an algorithm and to output a first characteristic value in a first period; and
    a comparing step, to compare the first characteristic value with the threshold value to generate a comparison result and to determine that the frame data of the input signal has the tone based on the comparison result.

13. The method according to claim 12, further comprising:
    a transmitting step to transmit the input signal from a transmitter to a receiver capable of moving relative to the transmitter.

14. The method according to claim 12, wherein, if the volume gain calculation step detects that the energy of the frame data is larger than a predetermined value, the magnitude of the frame data is reduced.

15. The method according to claim 14, wherein, if the energy of the frame data is larger than the predetermined value, the volume gain calculation step calculates the threshold value being the product of the energy of the volume-gain-treated frame data and a first coefficient, and if the energy of the frame data is smaller than the predetermined value, the volume gain calculation step calculates the threshold value being the product of the energy of the volume-gain-treated frame data and a second coefficient that is different from the first coefficient.

16. The method according to claim 12, wherein the conversion step further outputs a second characteristic value in a second period and determines that the frame data of the input signal does not have the tone if the first and second characteristic values do not satisfy a predetermined relationship.

17. The method according to claim 16, wherein the predetermined relationship is a frequency band continuing relation.

18. The method according to claim 16, wherein the conversion step utilizes the Goertzel algorithm.

19. The method according to claim 12, further comprising: a command-outputting step, to output a command when the number of the frame data having the tones is determined to satisfy a predetermined number.

20. The method according to claim 12, further comprising a command-outputting step that comprises:
 a bit determining step, to output a start bit when the number of the frame data having the tones with a first frequency is determined to satisfy a first predetermined number, to output the command bit having a first logic value when the number of the frame data having the tones with the first frequency is determined to satisfy a second predetermined number and the number of the frame data having the tones with a second frequency is determined to satisfy a third predetermined number, and to output the command bit having a second logic value when the number of the frame data having the tones with the first frequency is determined to satisfy a fourth predetermined number and the number of the frame data having the tones with the second frequency is determined to satisfy a fifth predetermined number; and
 a command determining step, to output the command when the number of the at least one command bit satisfies a predetermined number of bits.

21. The method according to claim 20, wherein the second predetermined number is equal to the fifth predetermined number, the third predetermined number is equal to the fourth predetermined number, and the first predetermined number is equal to the sum of the second predetermined number and the third predetermined number.

* * * * *